(12) United States Patent  
Lee (10) Patent No.: US 7,188,849 B2  
(45) Date of Patent: Mar. 13, 2007

(54) CHILD TRANSPORT VEHICLE AND CARRIER ADAPTED THEREFOR

(76) Inventor: Kwi Hoon Lee, 10 Old Railroad Ave. #1B, Haverford, PA (US) 19041

( * ) Notice: Subject to any disclaimer, the term of this patent is extended or adjusted under 35 U.S.C. 154(b) by 336 days.

(21) Appl. No.: 10/702,855

(22) Filed: Nov. 6, 2003

(65) Prior Publication Data

US 2005/0098972 A1   May 12, 2005

(51) Int. Cl.
    *B62B 9/12*   (2006.01)
(52) U.S. Cl. .................. 280/87.021; 280/32.7; 280/62
(58) Field of Classification Search ........... 280/33.992, 280/33.993, 87.01, 87.021, 87.041, 30, DIG. 4, 280/62, 288.4, 87.051, 32.7; 297/243
    See application file for complete search history.

(56) References Cited

U.S. PATENT DOCUMENTS

| | | | | |
|---|---|---|---|---|
| 1,399,833 A | * | 12/1921 | Wiebe | 280/7.1 |
| 1,418,569 A | * | 6/1922 | Herrick | 280/7.12 |
| 1,427,417 A | * | 8/1922 | Rickey | 280/202 |
| 1,661,257 A | * | 3/1928 | Kirch | 280/202 |
| 1,678,836 A | * | 7/1928 | Wessborg | 280/87.043 |
| 1,706,048 A | * | 3/1929 | Van De Mark | 280/87.041 |
| 1,838,877 A | * | 12/1931 | Stevens | 280/7.1 |
| 1,962,013 A | * | 6/1934 | Griffoul | 280/202 |
| 2,482,585 A | * | 9/1949 | Hauptman | 280/202 |
| 2,508,670 A | * | 5/1950 | Goldman | 280/47.35 |
| 2,907,372 A | * | 10/1959 | Leger | 280/7.1 |
| 3,834,726 A | * | 9/1974 | Hobza | 280/87.041 |
| 3,902,737 A | * | 9/1975 | Berger et al. | 280/202 |
| 4,096,920 A | * | 6/1978 | Heyn | 180/11 |
| 5,039,121 A | | 8/1991 | Holter | 280/220 |
| 5,785,331 A | | 7/1998 | Rappaport | 280/87.041 |
| 6,378,879 B2 | * | 4/2002 | Rappaport | 280/87.041 |
| 6,585,284 B2 | * | 7/2003 | Sweeney et al. | 280/650 |
| 6,991,243 B2 | * | 1/2006 | Boyle et al. | 280/87.05 |
| 7,004,272 B1 | * | 2/2006 | Brown et al. | 180/65.1 |

OTHER PUBLICATIONS

Trikke Products: http://www.trikke.co.uk/index.html, "What's a Trikke?".
Marky Sparky Toys: http://www.markysparkytoys.com/html/californiachariot.html, "Product Comparison: Schwinn Gladiator Vs. The California Chariot".
1-2-3 Child Carrier manufactured by Fischer-Price Instruction Manual Jan. 1999.

* cited by examiner

*Primary Examiner*—Christopher P. Ellis
*Assistant Examiner*—Bridget Avery
(74) *Attorney, Agent, or Firm*—Drinker Biddle & Reath LLP

(57) ABSTRACT

A child transport vehicle and child carrier adapted therefor which enables an adult rider to transport a young child and/or include the child in his/her daily exercise routine. The child transport vehicle has at least three wheels supporting a main structural frame in triangular pattern. The vehicle is characterized by a child carrier adapted for use in combination with the main structural frame such that the child is positioned rearwardly to face an adult rider during operation. The child transport vehicle provides exercise for the adult rider and entertainment/stimulation for the child rider.

7 Claims, 7 Drawing Sheets

CHILD TRANSPORT VEHICLE AND CARRIER ADAPTED THEREFOR

TECHNICAL FIELD

The present invention relates to child carrying vehicles, and more particularly, to a new and useful vehicle adapted for mounting a child carrier, i.e., a seat, to transport a young child or other precious cargo during operation.

BACKGROUND OF THE INVENTION

In today's age of physical fitness, health-conscious adults continuously seek ways and opportunities to exercise during the course of their busy home and work-life schedules. It is commonplace to see individuals (e.g., business executives, homemakers, mothers and fathers) jogging, cycling or walking in their spare time to maintain a good standard of health. At the same time, parents of young children desire to continue their fitness regiment as they care for their young children, e.g., infants and toddlers. Consequently, there is fast growing market for fitness equipment which allows the parent to include a young child during their exercise routine.

Children are commonly seen strapped to the back of a bicycle, towed behind in a buggy, or laying (sleeping or awake) in a runner's stroller. As they pass, onlookers smile to communicate their approval as they appreciate the extra effort being extended to include/involve and stimulate the development of the child. Conversely, the parent athlete feels a strong sense of satisfaction knowing that they are maintaining a high standard of health while at the same time maintaining a bond with their child.

While these vehicles and devices offer several advantages as discussed above, a disadvantage to certain of these child carrying vehicles or devices is that they often position the child out of a parent's direct line-of-sight. For example, an infant/toddler bicycle seat must necessarily be mounted aft of the cyclist to provide the rider with an unobstructed view of the rode ahead. As a result, accidents can occur such as when a child is not strapped-in properly or the child is able to detach the retention harness. Furthermore, while these infant/toddler seats enable the child to participate in the activity, they do not facilitate eye-to-eye contact between the young child and his/her parent. It will be appreciated that, for an infant, this can be particularly discomforting/distressing.

Among the litany of apparatus/vehicles which provide exercise for the user as well as a more rapid means of transport (i.e., faster than walking), are self-propelled scooters. Conventionally, scooters employ a rolling platform for supporting at least one foot of the rider and a steering assembly coupled to a forward wheel of the scooter. The scooter is propelled by having one foot of the rider push off the underlying ground surface while the other rests upon and convey forward motion to the scooter.

Scooters of the type described herein employ at least three (3) wheels disposed in a triangular pattern, i.e., a forward wheel coupled to the steering assembly and a pair of aft wheels laterally spaced apart for roll stability. Generally, the frame and platform are bifurcated into lateral segments, e.g., a right and left segment, to provide an open space therebetween to accommodate propulsion by one of the rider's feet/legs. Like more conventional scooters, the steering assembly comprises a steering column for supporting a steering shaft. The shaft is coupled to the forward wheel at one end thereof and includes handles or a wheel at the other end for steering the forward wheel. The steering column is typically mounted at a vertex or mid-point of a V- or U-shaped frame support (from a rear view perspective), thereby bifurcating the frame into lateral segments. In some of the more sophisticated models, a brake assembly is disposed in combination with the forward wheel for arresting the forward motion of the scooter. Holter U.S. Pat. No. 5,039,121, Rappaport U.S. Pat. No. 5,785,331 and Rappaport U.S. Pat. No. 6,378,879 illustrate and describe scooters of the tricycle-type and are generally indicative of the state-of-the-art. Such scooters are available from several sources including: Marky Sparky Toys located in Carlsbad, Calif. under the trade name "California Chariot", Pacific Cycle located in Madison, Wis. under the trademark "Schwinn Gladiator", and Trikke located in Kent, England under the trade names "Trikke.5", "Trikke.6" and "Trikke.8".

Scooters, such as the type described in the Holter '121 and Rappaport '121 & '879 patents, were developed to address safety issues associated with the side-to-side tipping of conventional two-wheeled scooter designs. Hence, with child safety being the design focus, such scooters have generally been designed and fabricated to accommodate a child's size and weight.

Scooters, which may be analogized to skateboards, have had greatest appeal in the past decade with athletes such as Tommy Hawk popularizing the sport and, as a consequence, the popularity of skateboards/scooters. As the generation of skateboard and scooter enthusiasts mature, it will undoubtedly generate an appeal for scooters adapted for the adult frame, i.e., size and weight. Further, the fusion between entertainment, health consciousness and parenthood will most assuredly occur for scooter/skateboard enthusiasts as it has already for runners/cyclists.

A need, therefore, exists for a vehicle adapted for the adult frame while, additionally, being adapted to carry a young child, e.g., an infant/toddler.

SUMMARY OF THE INVENTION

It is, therefore, an object of the present invention to provide a vehicle adapted for an adult frame while, additionally, being adapted to transport/carry a young child.

It is yet another object of the present invention to provide such a vehicle which maintains eye-to-eye contact between the child and adult rider.

It is yet a further object of the present invention to provide such a vehicle which provides a high quality of ride comfort and stability.

It is still further another object of the present invention to provide a child carrier adapted for use in combination with a tri-wheeled transport vehicle.

It is another object of the present invention to provide such a vehicle which provides exercise for the adult rider and entertainment/stimulation for the child rider.

These and other objects of the invention are achieved by a child transport vehicle and child carrier adapted therefor which enables an adult rider to transport a young child and/or include the child in his/her daily exercise routine. The child transport vehicle has at least three wheels supporting a main structural frame in a triangular pattern thereby defining a three-wheeled transport vehicle. The child transport vehicle is characterized by a child carrier adapted for use in combination with the three-wheeled transport vehicle such that the child is positioned rearwardly to face an adult rider during operation. The child transport vehicle provides exercise for the adult rider and entertainment/stimulation for the child rider.

BRIEF DESCRIPTION OF THE DRAWINGS

For the purpose of illustrating the invention, there is shown in the drawings various forms that are presently preferred; it being understood, however, that this invention is not limited to the precise arrangements and constructions particularly shown.

FIG. 5b is a cross sectional view taken substantially along line 5b—5b of FIG. 5a.

FIG. 6b is a cross sectional view taken substantially along line 6b—6b of FIG. 6a.

FIG. 7b is a cross sectional view taken substantially along line 7b—7b of FIG. 7a.

DETAILED DESCRIPTION OF THE DRAWINGS

Figure 1:
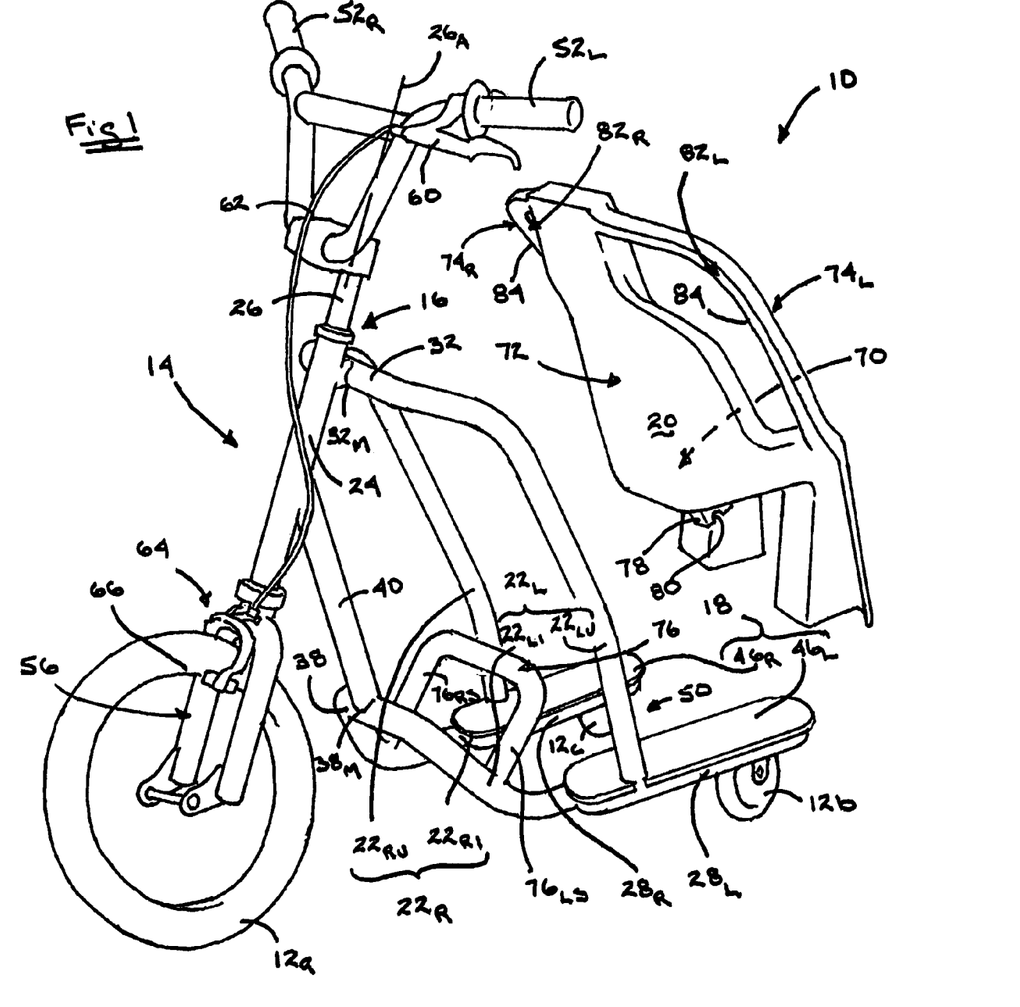
FIG. 1 is an exploded front perspective view of the child transport vehicle according to the present invention including a triangular arrangement of three wheels supporting a main structural frame and a child carrier disposed in combination with the main structural frame.

Referring now to the drawings wherein like reference numerals identify like elements, components, subassemblies etc., FIG. 1 depicts a child transport vehicle according to the present invention. The child transport vehicle 10 includes at least three wheels 12a, 12b, 12c disposed in a triangular pattern for supporting a main structural frame 14 and a steering assembly 16. The main structural frame 14 includes a platform 18 for supporting a rider (not shown) and a child carrier 20. The child carrier 20 is adapted for being disposed in combination with the main structural frame 14 and, more specifically, adapted to face a child rearwardly toward the rider during operation.

Specifically, the main structural frame 14 is bifurcated to form a pair of branches $22_R$, $22_L$. Each of the branches $22_R$, $22_L$ is coupled to a steering sleeve or column 24 for accepting a shaft 26 of the steering assembly 16. The branches $22_R$, $22_L$ extend downwardly and rearwardly from the column 24 to a pair of horizontal support segments $28_R$, $28_L$ for mounting the platform 18 thereto. In the preferred embodiment, the branches $22_R$, $22_L$ are tubular in construction and are substantially circular in cross section. For added structural rigidity, the main structural frame 14 may include upper and lower sub-branches $22_{Ru}$, $22_{R1}$ and $22_{Lu}$, $22_{L1}$, respectively, wherein the sub-branches $22_{Ru}$ and $22_{Lu}$, and $22_{R1}$ and $22_{L1}$ each converge forwardly of each of the horizontal support segments $28_R$, $28_L$. In the preferred embodiment, the upper sub-branches $22_{Ru}$, $22_{Lu}$ in combination with a connecting cross member 32 define an inverted U-shape wherein the steering assembly column 24 is affixed to a mid-section $32_M$ of the cross member 32 Further, the lower sub-branches $22_{R1}$, $22_{L1}$ in combination with a connecting cross member 38 and a vertical stem 40 define an inverted Y-shape. The stem 40 is affixed at one end to the steering assembly column 24 and at the other end to a mid-section $38_M$ of the cross member 38. The sub-branches $22_{Ru}$, $22_{R1}$, $22_{Lu}$, $22_{L1}$ structurally augment the main structural frame 14 by increasing the bending stiffness of the branches $22_R$, $22_L$ in this area. While a single large diameter tubular structure could be employed to form each of the branches $22_R$, $22_L$, two, relatively small diameter tubular structures are employed to yield the requisite bending stiffness.

In the preferred embodiment, the platform 18 is bifurcated to produce right and left hand segments $46_R$, $46_L$ which are spaced-apart to define a region 50 of open space therebetween. However, as will be seen when discussing alternate embodiments of the invention, the platform 18 may be a unitary structure, i.e., one piece, mounting upon the horizontal segments $28_R$, $28_L$ of the main structural frame 14.

The steering assembly 16 includes a pair of handles 52a, 52b projecting substantially orthogonally from the pivot axis $26_A$ of the shaft 26 in a conventional manner. The forward wheel 12a mounts to the other end of the steering assembly 16 by a conventional yoke assembly 56. The yoke assembly 56 may be integral with the shaft 26, e.g., welded thereto, or may be coupled by conventional fastening means, e.g., a nut and bolt connection. In the preferred embodiment, a braking assembly 60 is disposed in combination with one or both of the handles 52a, 52b and includes a cable assembly 62, i.e. cable slideably mounting within an external sheath, for closing a pair of brake pads 64 about the rim 66 of the forward wheel 12a.

Figure 2:
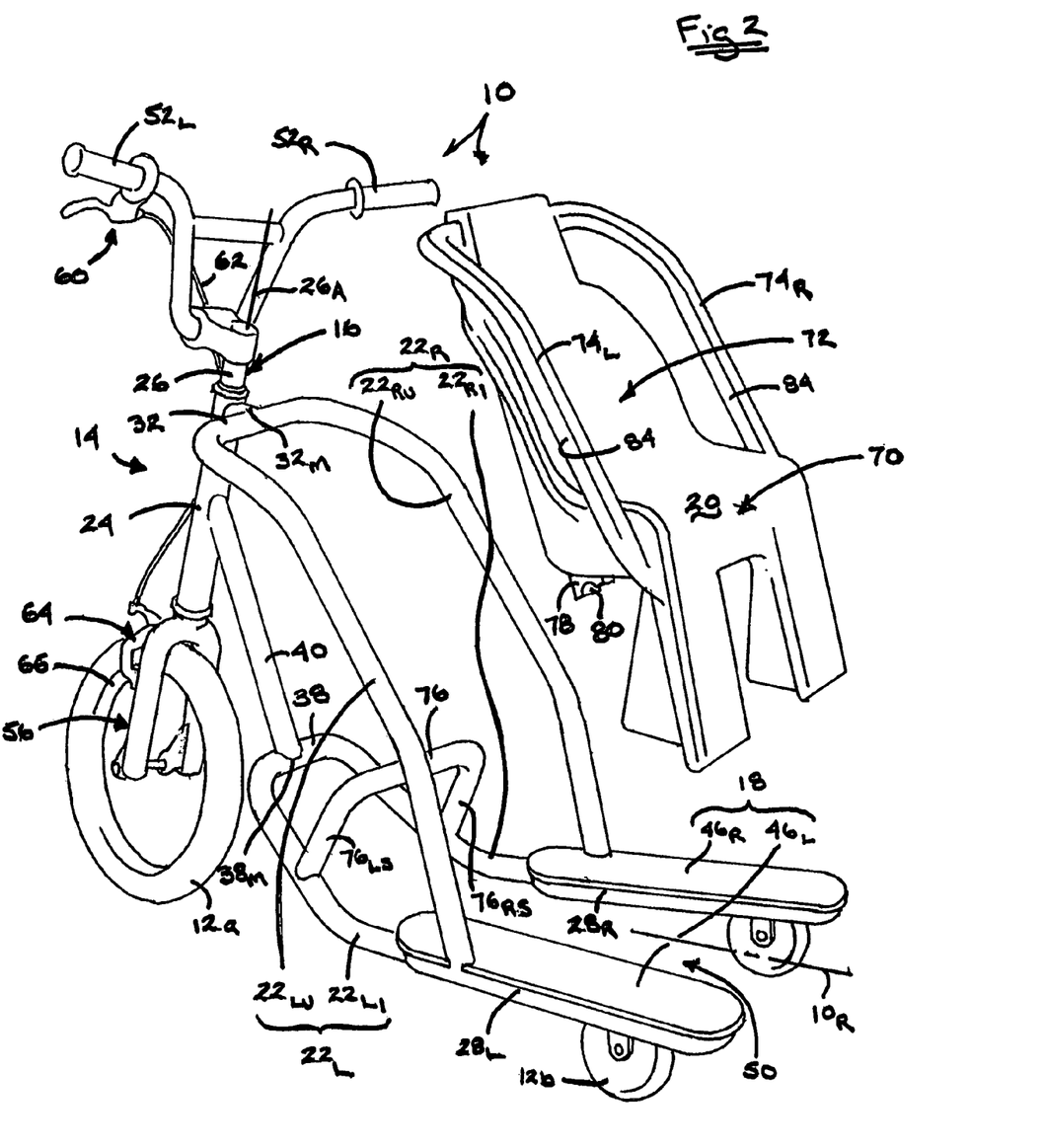
FIG. 2 is an exploded rear perspective view of the child transport vehicle according to the present invention.

In FIGS. 1 and 2, the wheels 12a, 12b, 12c are, preferably arranged in a triangular pattern to support the main structural frame 14 and the steering assembly 16. The aft wheels 12b, 12c are spaced-apart to stabilize the child transport vehicle 10 about a longitudinal roll axis $10_R$ (see FIG. 2) and, specifically, each of the aft wheels 12b, 12c supports one of the horizontal segments $28_R$, $28_L$ of the main structural frame 14, i.e., the segments $28_R$, $28_L$ upon which mount the platform segments $46_R$, $46_L$. In the preferred embodiment, the forward and aft wheels 12a, 12b, 12c are pneumatic, i.e., filled with air. However, it is also contemplated that the aft wheels may be solid, i.e., composed of a high durometer elastomer or urethane similar to wheels employed in conventional in-line skates. In one preferred embodiment, the front wheel 12a has a diameter dimension which is about 50% larger than the aft wheels 12b, 12c. As shown, the front wheel 12a is approximately sixteen (16) inches in diameter while the aft wheels 12b, 12c range in diameter from about six (6) to about (10) inches in diameter, i.e., depending upon whether the wheels 12b, 12c are disposed beneath or to a side of the platform 18. Such arrangements for mounting the aft wheels 12b, 12c are discussed in subsequent paragraphs.

Figure 3:
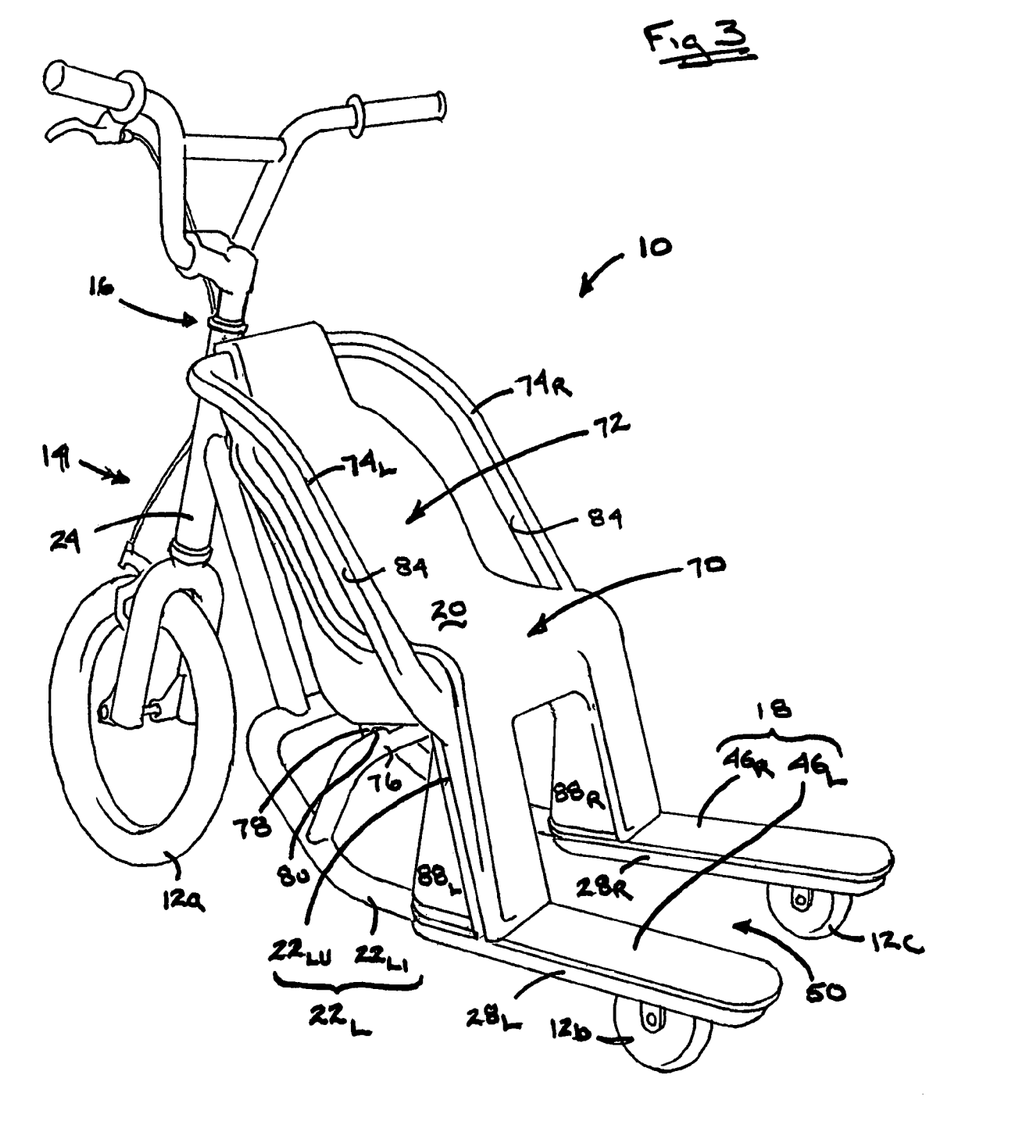
FIG. 3 is a rear perspective view of the assembled child transport vehicle according to the present invention.

In FIGS. 2 and 3, the child carrier 20 is adapted for being disposed in combination with the branches $22_R$, $22_L$ of the main structural frame 14 forwardly of the platform 18, and, more preferably, adapted for mounting to the upper sub-branches $22_{Ru}$, $22_{Lu}$ thereof between the platform 18 and the steering assembly 24. Further, the child carrier 20 is adapted for mounting to the branches $22_R$, $22_L$ such that a child faces rearwardly in the child carrier 20, i.e., toward the platform 18. The child carrier 20 includes a seat support 70 and a back support 72 having mounting structures $74_R$, $74_L$ disposed to each side of the back support 72. Preferably, the seat support 70 is supported along its underside by a span bar 76 extending across the branches $22_R$, $22_L$. Further, the seat support 70 includes mounting blocks 78 having a bearing surface 80 for seating upon the span bar 76. Preferably, the span bar 76 includes vertical stanchions $76_{RS}$, $76_{LS}$ (see FIG. 2) to raise the child carrier 20 relative to the ground. In the described embodiment, the vertical stanchions $76_{RS}$, $76_{LS}$ are disposed in combination with the lower sub-branches $22_{R1}$, $22_{L1}$ and are integral with the ends of the span bar 76, however, a variety of mounting arrangements are contemplated. For example, the vertical stanchions may hang vertically downward (not shown in this configuration) from the upper sub-branches, thereby defining a swing support for cradling the child carrier.

The side mounting structures $74_R$, $74_L$ of the back support 72 preferably defines channels $82_R$, $82_L$ (see FIG. 2) along each side of the back support 72 for engaging the branches $22_R$, $22_L$ of the main structural frame 14. Each of the channels $82_R$, $82_L$ may have resilient channel walls 84 which are slightly undersized relative to the width or diameter of each of the respective branches $22_R$, $22_L$. As such, the channels $82_R$, $82_L$ may be caused to snap over and resiliently capture the branches $22_R$, $22_L$. While, the preferred mounting arrangement may include resilient channels for simplicity of engagement, it will be appreciated that other clamping or strapping devices may be employed. For example, and referring to FIG. 4, VELCRO® hook and loop fasteners/straps (VELCRO is a registered trademark of Velcro Industries B. V. located in Manchester, N.H.) may be employed for circumscribing each of the branches. Alternatively, retention pins may be employed for engaging aligned apertures formed in the side mounting structures of the back support and the branches (this configuration is not shown in the figures).

It should be readily apparent from the drawings that the side mounting structures provide added protection for the child since they function as a roll cage in the event the vehicle falls sideways.

The child carrier 20 may include protective plastic shields 88a, 88b (see FIG. 3) disposed along the backside of a child's legs to protect the child from any debris which may be made airborne by other vehicles, e.g., automobiles, or from the front wheel 12a, of the vehicle 10. Moreover, another protective shield (not shown) may be disposed across the front of a child's thigh or hip area to prevent the adult rider from inadvertently impacting the child while stepping forward to propel the vehicle 10.

Figure 5A:
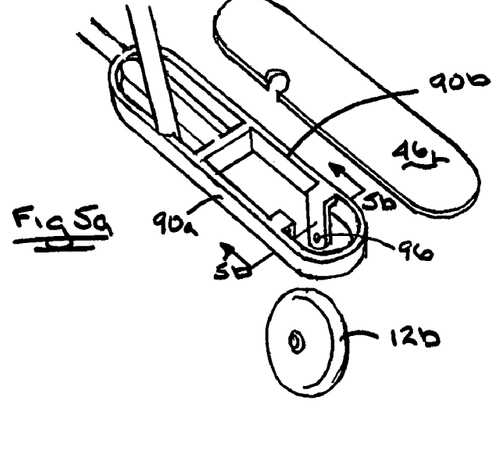
FIG. 5a is an exploded view of an arrangement for mounting an aft wheel in combination with a platform/platform segment of the inventive child transport vehicle.
Figure 5B:
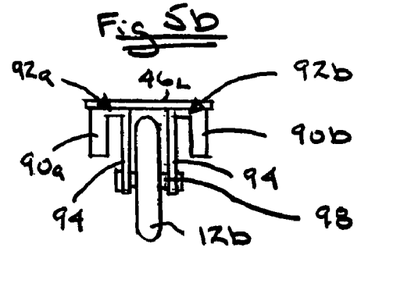

In FIGS. 5a–7b, various arrangements are depicted for mounting the aft wheels 12b, 12c to the horizontal support segments $28_R$, $28_L$. Inasmuch as each of the support segments $28_R$, $28_L$ are essentially identical, only the left segment $28_L$ will be described. In FIGS. 5a and 5b, the horizontal support segment $28_L$ is elliptical or rectangular in shape and comprises longitudinal side supports 90a, 90b each mounting right-angle brackets 92a, 92b (FIG. 5b). More specifically, each of the brackets 92a, 92b have a downwardly projecting axle lug 94. The axle lugs 94 define aligned apertures 96 (FIG. 5a) for accepting a wheel mounting axle 98. As such, the aft wheels 12b is disposed beneath the platform segment $46_L$ (best seen in FIG. 5a).

Figure 6A:
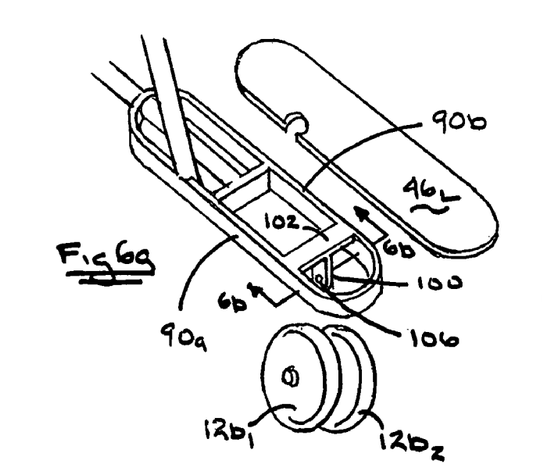
FIG. 6a is an exploded view of an alternate arrangement for mounting the aft wheel in combination with the platform/platform segment.
Figure 6B:
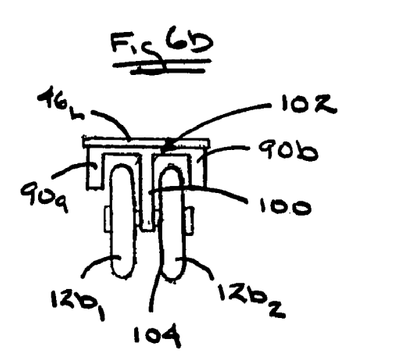

In FIGS. 6a and 6b, a single axle lug 100 projects downwardly from a beam 102 extending laterally across the side supports 90a, 90b of each of the horizontal support segments $28_R$, $28_L$. The aft wheel 12b may then comprise a pair of wheels $12b_1$, $12b_2$, sharing a common axle 104 extending through an aperture 106 (see FIG. 6a) formed in the lug 100. As such, the wheel pairs $12b_1$, $12b_2$ reduce the load and, consequently, the wear on the wheels $12b_1$, $12b_2$.

Figure 7A:
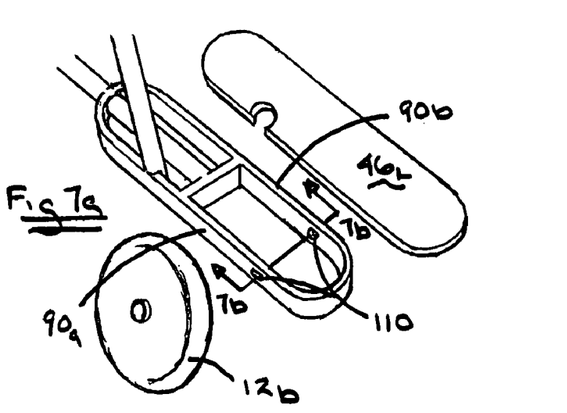
FIG. 7a is an exploded view of an alternate arrangement for mounting the aft wheel in combination with the platform/platform segment.
Figure 7B:
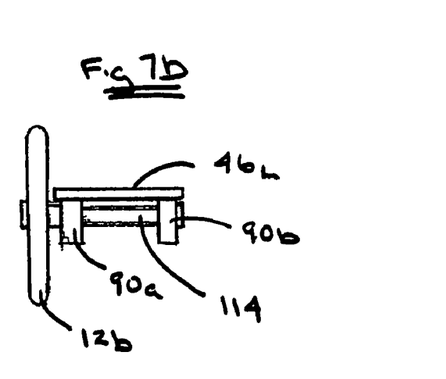
Figure 9:
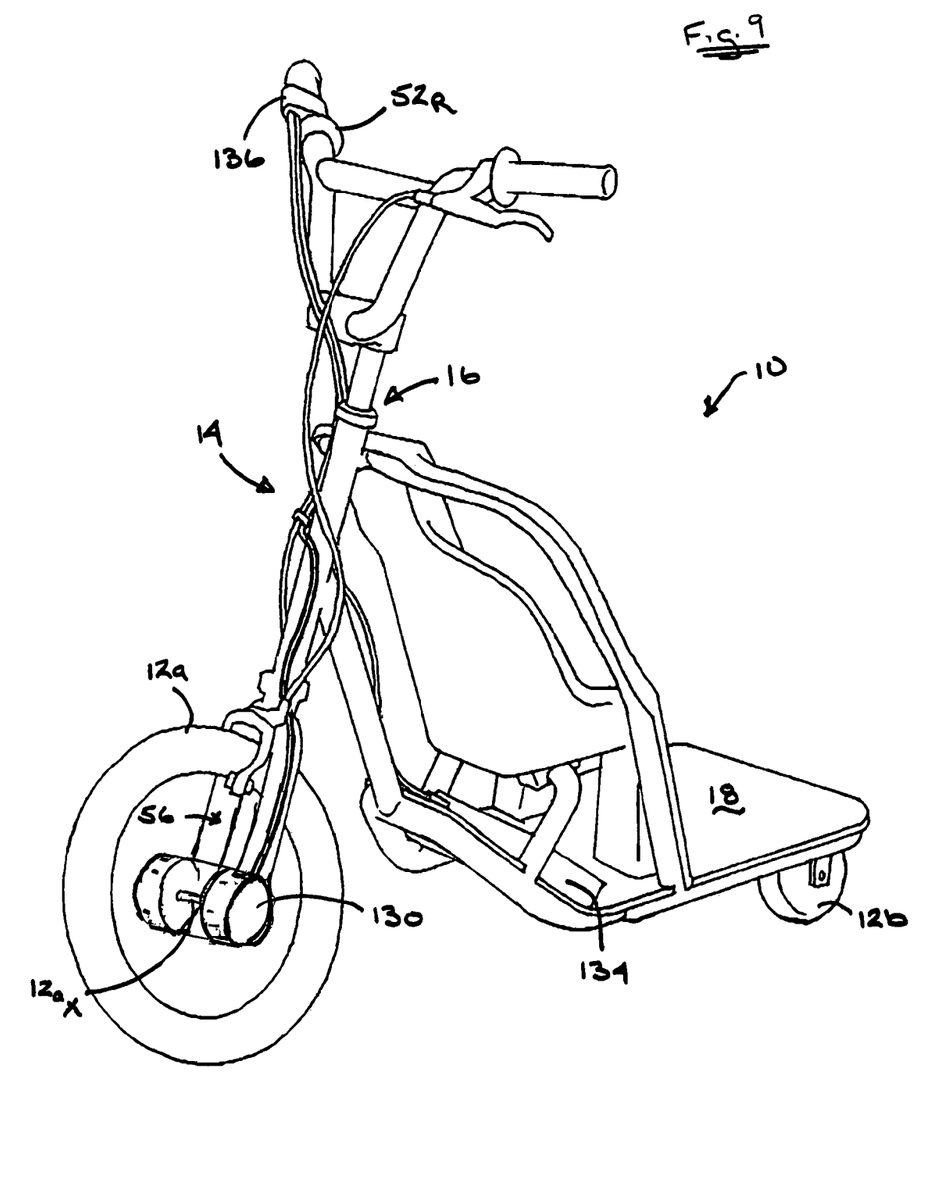
FIG. 9 is an alternate embodiment of a motorized child transport vehicle including a unitary platform for supporting an adult rider.

To improve the ride characteristics of the child transport vehicle 10, the aft wheels 12b may be larger in diameter, e.g., ten (10) inches in diameter. As such, the wheel 12b is better able to traverse imperfections on the ride surface. In FIGS. 7a and 7b, such larger diameter aft wheel 12b is each disposed along the outboard edges of each of the platform segments $28_L$. In this embodiment, aligned apertures 110 are formed in each of the side supports 90a, 90b to accept a wheel supporting axle 114 (see FIG. 7b)

Figures 4, 8:
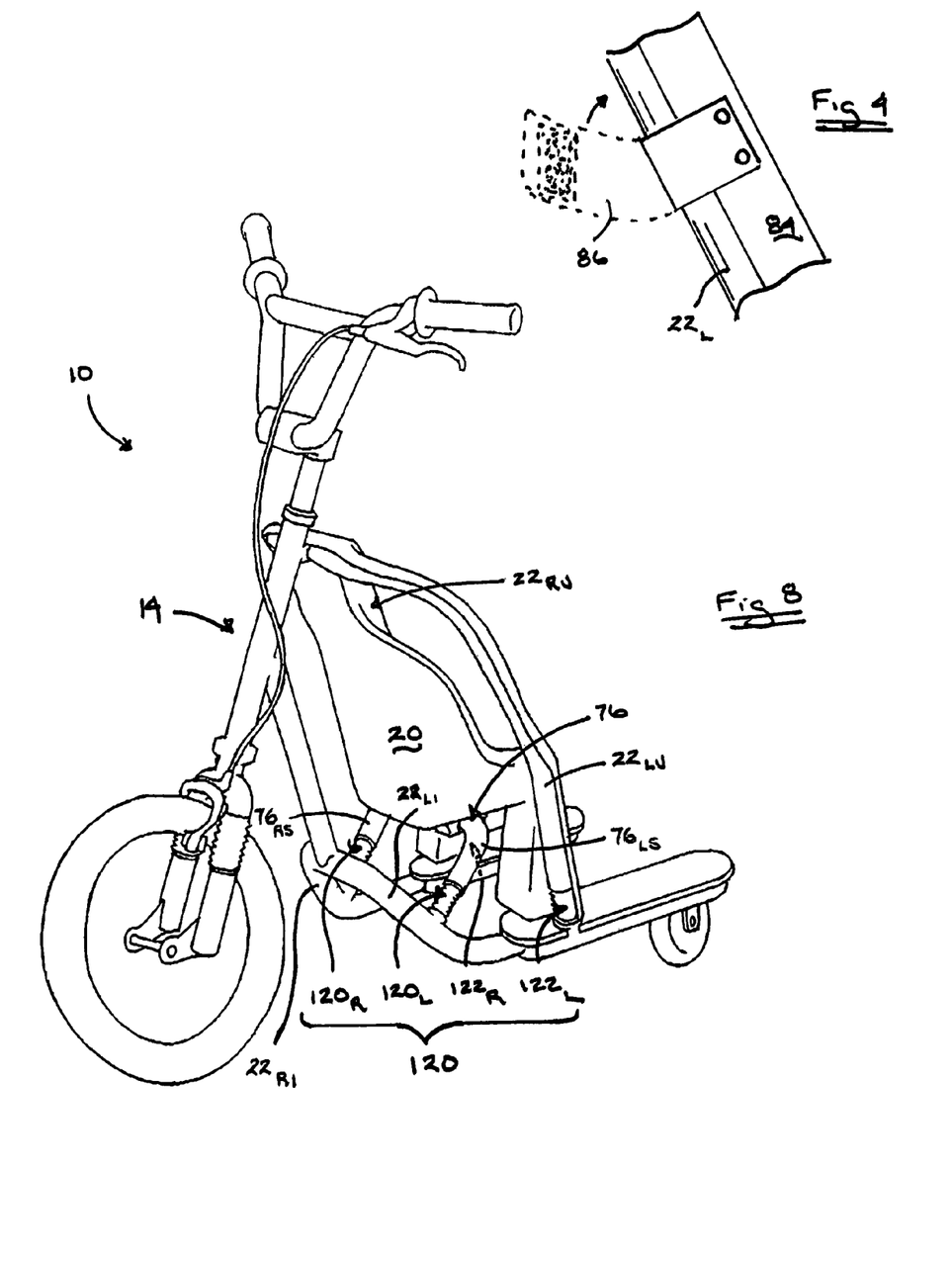
FIG. 4 is a partially broken away side view of a strap means for retaining the child carrier relative to a main structural frame of the scooter.
FIG. 8 is an alternate embodiment of the child transport vehicle including an isolation system for mitigating the transmission of vibration into the child carrier.

To further improve ride efficacy, especially for the child rider, an isolation system 120 may be interposed between the child carrier 20 and the main structural frame 14. In FIG. 8, a first pair of spring strut assemblies $120_R$, $120_L$ are interposed at the juncture of the vertical stanchions $76_{RS}$, $76_{LS}$ and the lower sub-branches $22_{R1}$, $22_{L1}$ of the main frame assembly 14. Further, a second pair of spring strut assemblies $122_R$, $122_L$ are interposed at the juncture where the upper and lower sub-branches $22_{Ru}$, $22_{R1}$, and $22_{Lu}$, $22_{L1}$, respectively, converge, i.e., between lower portion of the upper sub-branches $22_{Ru}$, $22_{Lu}$, and the lower sub-branches $22_{R1}$, $22_{L1}$. Accordingly, the spring struts $120_R$, $120_L$, $122_R$, $122_L$ isolate the child carrier 20 by reducing the transmissibility of vibrations into the span bar 76 or into the upper sub-branches $22_{Ru}$, $22_{R1}$. It is also contemplated that, instead of spring strut assemblies $120_R$, $120_L$, a single spring strut assembly (not shown) could be located at the mounting of the seat bottom to the span bar 76. While conventional spring strut assemblies are employed, other isolation or damping devices may be employed. For example, leaf, coil or cantilever springs may be employed, or pneumatic and/or hydraulic damping strut may be incorporated.

Figure 10:
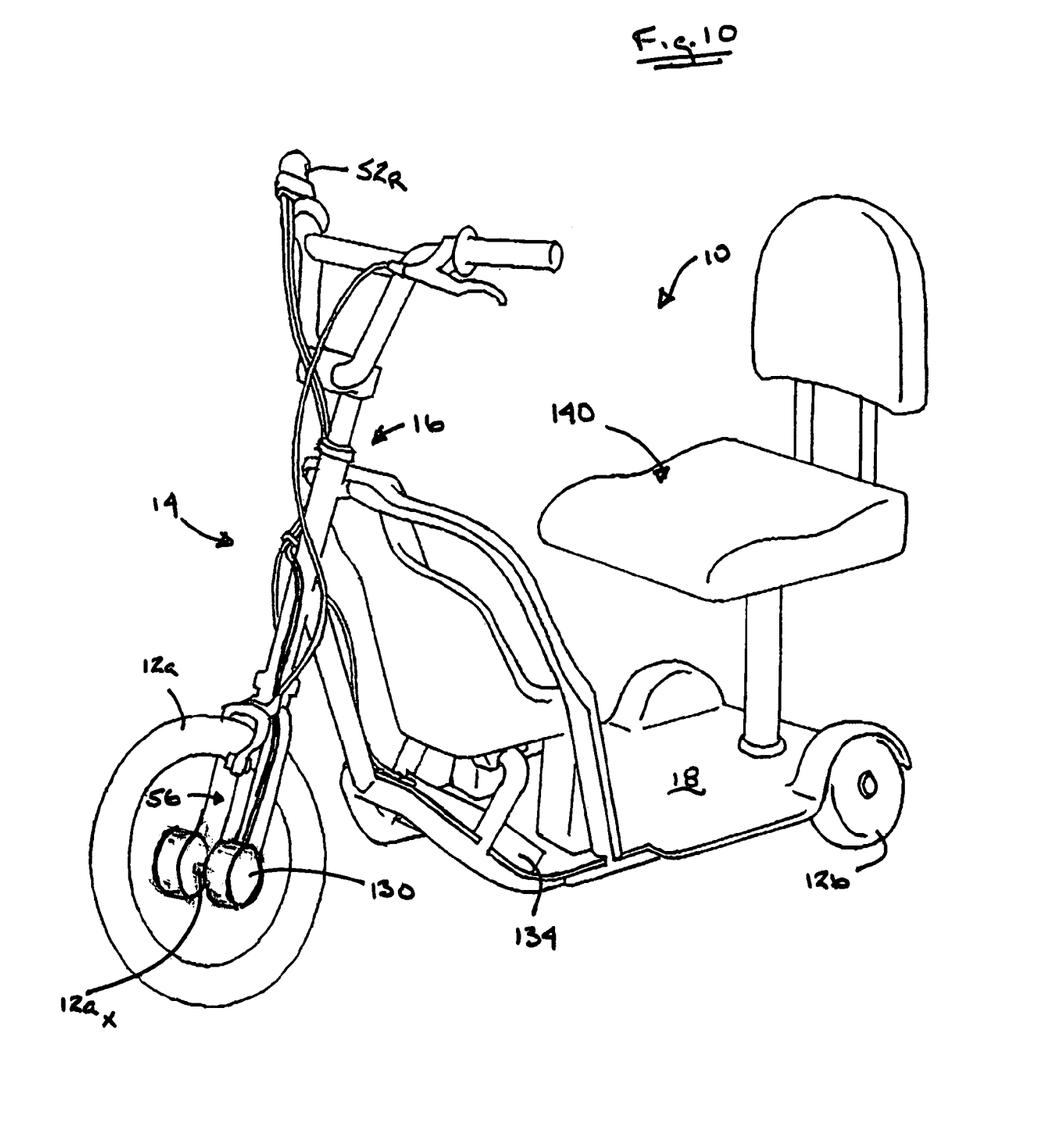
FIG. 10 is yet another alternate embodiment of a motorized child transport vehicle including a unitary platform and a seat for supporting an adult rider.

While the child transport vehicle 10 is preferably self-propelled to provide the rider with a form of physical exercise, the vehicle 10, as shown in FIG. 8 may include a motor for driving one or more of the supporting wheels 12a, 12b, 12c. In this embodiment, the main frame structure 14 is essentially identical to the self-propelled versions shown in the prior figures, however, if desired, the platform 18 may be of a unitary construction, i.e., one-piece platform, rather than segmented. In the described embodiment, an electric motor 130 is disposed in combination with the front wheel axle $12a_x$, and mounted to the yoke assembly 56 of the steering assembly 16. A flexible cable 132 provides electric power to the motor 130 via a power source, such as a battery pack 134. A control throttle 136 is disposed in combination with the right handle $52_R$ of the steering assembly for controlling the power and, consequently the speed of the vehicle 10. In yet another embodiment of the present invention shown in FIG. 10, the motorized vehicle 10 may employ a seat 140 for supporting the adult rider. Once again, while exercise is not an objective for this embodiment, all of the other advantages of child transport vehicle still remain.

In summary, the child transport vehicle 10 is adapted for an adult frame while, additionally, being adapted to transport/carry a young child. The vehicle 10 provides exercise for the adult rider while, at the same time, providing entertainment for the child rider. The child rider is stimulated for its development while maintaining eye-to-eye contact with the adult rider to provide a sense of security.

Further, the vehicle 10 of the present invention provides a high quality of ride comfort and stability by a triangular wheel configuration having an isolation system for preventing the transmission of vibration to the child carrier 20. Moreover, a child carrier 20 is adapted for use with the three-wheeled vehicle which provides protection for the child while facilitating assembly and removal. Finally, various wheel mounting arrangements are provided to reduce wear and improve ride efficacy, e.g., large, pneumatic wheels disposed to a side of a platform/platform segment. Motorized versions of the child transport device 10 provide all of these same advantages without the component of exercise.

While the invention has characterized an "adult rider" in the context of a parent, it will be appreciated that the term is intended to mean any person capable of propelling a child rider in the transport vehicle. While a steering column 24 is employed for supporting the steering assembly 16, it will be appreciated that a variety of mounting arrangements my be used for coupling the steering assembly 16 to the main structural frame 14. Furthermore, while the child carrier 20 is shown to comprise a seat support, back support, and leg protectors etc., the child carrier 20 is minimally intended to include a seat supported by main structural frame 14, e.g., the branches of a three-wheeled transport device such that the child faces rearwardly. Moreover, while the child carrier 20 is shown mounting to the branches by way of channels, blocks or straps, any means which safely and securely mounts the child carrier to the main structural frame may be employed.

Although the braking assembly 60 for arresting the forward motion of the child transport vehicle 10 is associated with the forward wheel 12a, other braking devices may be utilized. For example, it is envisioned that a friction brake (not shown) could be used which is pivotally mounted to the main structural frame and envelopes an upper portion of at least one of the aft wheels. The friction brake is spring biased out of contact with the aft wheel during riding operations and is displaceable (by a rider's foot) into contact with the wheel when braking. That is, the rider applies his/her weight on the friction brake to arrest the rotational motion of the aft wheel.

Further, a variety of other modifications to the embodiments will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A child transport vehicle comprising a main structural frame, at least three wheels disposed in a triangular pattern for supporting the main structural frame, a steering assembly attached to the frame, a platform mounted to the frame for supporting a rider, and a non-foldable child carrier disposed in combination with the main structural frame, said child carrier mounted so as to face a child rearwardly toward the rider during operation;

wherein said main structural frame defines a pair of branches, each branch including a horizontal support structure; wherein said platform is disposed in combination with said horizontal support structures; and wherein said child carrier is disposed in combination with each of said branches forwardly of said platform; the child transport vehicle further comprising:
a span bar extending between said branches;
wherein said platform is defined by a pair of spaced apart platform segments, and
wherein said child carrier includes:
a seat support; and
a back support having mounting structures located on the lateral sides of the back support,
said seat support being supported along its underside by said span bar, and
wherein said branches are disposed in combination with said mounting structures to support said child carrier.

2. The child transport vehicle according to claim 1 wherein said span bar includes vertical stanchions; said vertical stanchions being engaged with the branches to support the seat support.

3. The child transport vehicle according to claim 1 wherein each said horizontal support segment supports a platform structure and a wheel, each said support structure further comprising:
a pair of longitudinal side supports,
a right-angle bracket mounted to each side support and having a downwardly projecting axle lug, said axle lugs defining aligned apertures; and
an axle disposed through said apertures of said lugs and supporting said wheel beneath said platform segment.

4. A child transport vehicle comprising:
a main structural frame including a pair of branches, each branch including a horizontal support structure;
a platform mounted to said horizontal support structures for supporting a rider;
at least three wheels disposed in a triangular pattern, at least one of said wheels disposed in combination with and supporting a steering assembly and at least one wheel mounted to each of the horizontal support structures; and
a child carrier disposed in combination with each of said branches forwardly of said platform;
wherein the steering assembly is mounted to the main structural frame forwardly of said branches; and wherein said child carrier is mounted between said platform and said steering assembly and oriented to face a child rearwardly toward the rider during operation;
the child transport vehicle further comprising:
a span bar extending between said branches;
wherein said platform is defined by a pair of spaced apart platform segments, and
wherein said child carrier includes:
a seat support; and
a back support having mounting structures disposed to each side thereof of the back support,
said seat support being supported along its underside by said span bar, and
wherein said branches are disposed in combination with said mounting structures to support said child carrier.

5. The child transport vehicle according to claim 4 wherein said span bar includes two vertical stanchions, each stanchion having one end attached to a branch.

6. The child transport vehicle according to claim 4 wherein each said horizontal support structure supports a platform segment and has a wheel mounted to it, each said support structure further comprising:
a pair of longitudinal side supports,
a right-angle bracket mounted to each side support and having a downwardly projecting axle lug, said axle lugs defining aligned apertures; and an axle disposed through said apertures of said lugs and supporting said wheel beneath said platform segment.

7. A child carrier comprising:

a non-foldable seat for supporting a child; and at least one mounting device for mounting said seat in combination with a main structural frame of a three-wheeled vehicle having a platform for supporting a rider, said mounting device positioning said seat forwardly of said platform such that the child faces said rider;

wherein said child carrier further comprises mounting blocks disposed on the underside of said seat support, each said mounting block including a bearing surface, wherein side mounting structures of said back support each include a channel, wherein said branches of said main structure frame are tubular in construction, and wherein said main structural frame defines a span bar connecting said branches, said channels of said mounting structures and said bearing surfaces of said mounting blocks engaging said tubular branches and said span bar, respectively.

* * * * *